United States Patent [19]
Van Den Berg

[11] Patent Number: 5,818,224
[45] Date of Patent: Oct. 6, 1998

[54] ENCAPSULATED TRANSDUCER WITH AN INTEGRALLY FORMED FULL LENGTH SLEEVE AND A COMPONENT ALIGNMENT PREFORM AND METHOD OF MANUFACTURE

[75] Inventor: Dave Van Den Berg, Minden, Nev.

[73] Assignee: Bently Nevada Corporation, Minden, Nev.

[21] Appl. No.: 543,113

[22] Filed: Oct. 13, 1995

[51] Int. Cl.$^6$ .............. G01B 7/14; G01H 11/02; G01R 3/00; B29C 45/00
[52] U.S. Cl. .......... 324/207.16; 29/595; 73/660; 73/661; 174/52.2; 264/272.15; 324/207.26
[58] Field of Search ................ 324/207.15, 207.16, 324/207.25, 207.26, 236, 237, 173, 174; 29/595, 602.1, 605, 606; 264/272.13, 272.15, 272.16, 272.19; 336/92, 96, 205; 73/660, 661; 174/52.1–52.3

[56] References Cited

U.S. PATENT DOCUMENTS

| | | | |
|---|---|---|---|
| 2,361,348 | 10/1944 | Dickson et al. | 18/30 |
| 2,890,505 | 6/1959 | Brand | 22/151 |
| 3,932,828 | 1/1976 | Plunkett et al. | 336/96 |
| 4,000,877 | 1/1977 | Shead et al. | 249/82 |
| 4,162,138 | 7/1979 | Byrne | 425/125 |
| 4,377,548 | 3/1983 | Pierpont | 264/265 |
| 4,408,159 | 10/1983 | Prox | 324/207 |
| 4,419,646 | 12/1983 | Hermle | 336/90 |
| 4,470,786 | 9/1984 | Sano et al. | 425/125 |
| 4,680,543 | 7/1987 | Kohen | 324/208 |
| 4,829,245 | 5/1989 | Echasseriau et al. | 324/174 |
| 4,849,728 | 7/1989 | Goll et al. | 336/92 |
| 4,954,307 | 9/1990 | Yokoyama | 264/272.15 |
| 4,959,000 | 9/1990 | Giza | 425/116 |
| 5,016,343 | 5/1991 | Schutts | 29/605 |
| 5,018,049 | 5/1991 | Mehnert | 361/380 |
| 5,021,737 | 6/1991 | Schutts | 324/207.11 |
| 5,036,285 | 7/1991 | Shaw | 324/236 X |
| 5,039,942 | 8/1991 | Buchschmid et al. | 324/174 |
| 5,049,055 | 9/1991 | Yokoyama | 425/116 |
| 5,122,046 | 6/1992 | Lavallee et al. | 425/116 |
| 5,133,921 | 7/1992 | Yokoyama | 264/272.15 |

(List continued on next page.)

FOREIGN PATENT DOCUMENTS

| | | |
|---|---|---|
| 2576245 | 7/1986 | France . |
| 3064279 | 6/1978 | Japan . |
| 6037130 | 7/1992 | Japan . |
| 1313748 | 4/1973 | United Kingdom . |
| 1353603 | 5/1974 | United Kingdom . |
| 8403794 | 9/1984 | WIPO . |

*Primary Examiner*—Gerard R. Strecker
*Attorney, Agent, or Firm*—Bernhard Kreten

[57] ABSTRACT

An encapsulated transducer (10) includes an injection molded encapsulation ensconcing a sensing element (90) proximate the front end (22) and a portion of an information transmitting medium (120) emanating from the back end (24). A component alignment preform (40) operatively couples the sensing element (90) with the information transmitting medium (120). The preform (40) includes a front ferrule (70) and a rear ferrule (80) bonded thereto and linearly spaced apart along a long axis "A". The preform (40) further includes an annular recess (44) in which the sensing element or coil (90) is placed. A first lead (98) and a second lead (100) of the coil are electrically connected to the front ferrule (70) and the rear ferrule (80), respectively. A back end (48) of the preform (40) receives a stripped end (122) of the cable (120) such that a plurality of conductors are operatively coupled to the front ferrule (70) and the rear ferrule (80) and to the leads of the coil. A protective sleeve (150) is transfer molded over the coil (90) and interlocked with the preform 40 thereby forming a sleeved coil and cable assembly (170). The sleeved coil and cable assembly (170) is symmetrically disposed within the injection molded encapsulation (20) comprised of a seamless mass including an integrally formed protective front wall having an uniform thickness "T" along a forwardmost portion of the sensing element (90) and seamlessly transitioning into an uninterrupted side wall circumscribing the sensing element and a portion of the cable.

27 Claims, 8 Drawing Sheets

U.S. PATENT DOCUMENTS

| | | | |
|---|---|---|---|
| 5,138,292 | 8/1992 | Forster | 335/278 |
| 5,147,657 | 9/1992 | Giza | 425/117 |
| 5,151,277 | 9/1992 | Bernardon et al. | 425/112 |
| 5,182,032 | 1/1993 | Dickie et al. | 249/91 |
| 5,226,221 | 7/1993 | Kilgore | 29/605 |
| 5,240,397 | 8/1993 | Fay et al. | 425/145 |
| 5,252,051 | 10/1993 | Miyamoto et al. | 425/116 |
| 5,351,388 | 10/1994 | Van Den Berg et al. | 29/602.1 |
| 5,376,325 | 12/1994 | Ormson | 264/254 |
| 5,381,089 | 1/1995 | Dickmeyer et al. | 324/174 |
| 5,418,454 | 5/1995 | Togo | 324/207.15 |

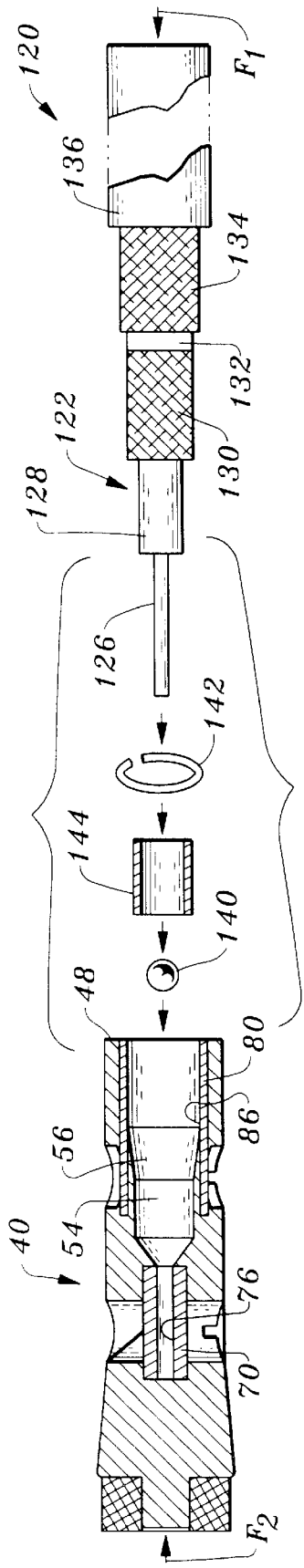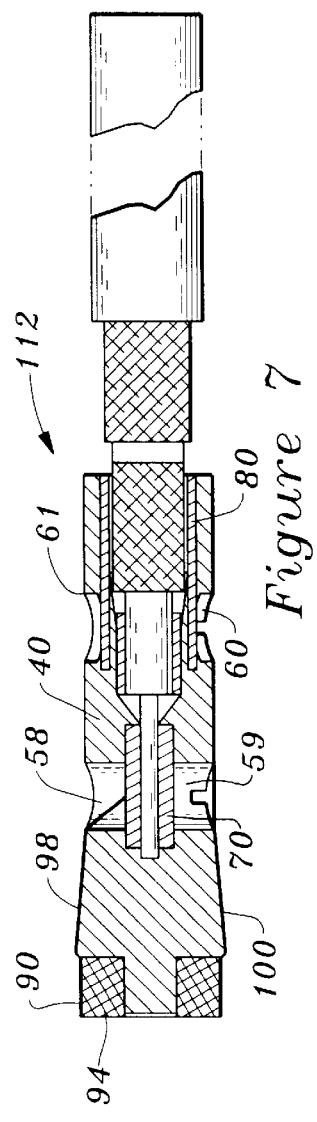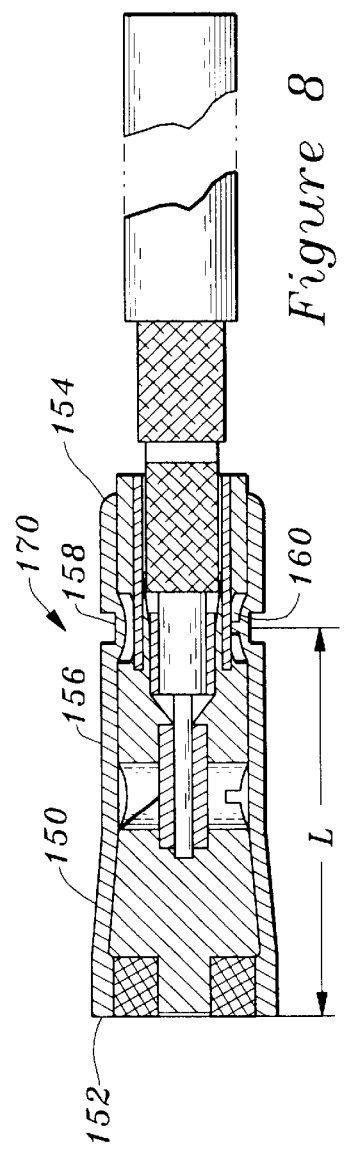

ENCAPSULATED TRANSDUCER WITH AN INTEGRALLY FORMED FULL LENGTH SLEEVE AND A COMPONENT ALIGNMENT PREFORM AND METHOD OF MANUFACTURE

FIELD OF THE INVENTION

The present invention relates generally to an encapsulated transducer with anintegrally formed sleeve and a component alignment preform and, in particular, to an encapsulated transducer substantially impervious to adverse mechanical, physical or chemical aggressions from the surrounding environment and method of manufacturing such transducer which is used to monitor vibration of rotating machinery, temperature sensing and the monitoring and sensing of other physical phenomenon.

BACKGROUND OF THE INVENTION

Monitoring and diagnosing the status of rotating and reciprocating machinery start with accurate and dependable measurements from a transducer and its associated electronics and then proceed to other sophisticated analyzing apparatus for reduction and display. One such transducer is a proximity transducer which may be utilized for, inter alia, monitoring the vibration characteristics of a rotating shaft of a machine. In this environment, the transducer must operate under very adverse physical, chemical and mechanical conditions and it is often very difficult to replace such transducers. Thus, there is an ongoing effort to make the proximity transducer one of the most reliable parts of the monitoring system.

Typically, the proximity transducer, in conjunction with associated electronics, outputs a signal correlative to the spacing between an object or "target" (the rotating shaft of the machine) and a sensing coil of the proximity transducer. It is critical that the length or spacing between the target and the sensing coil of the proximity transducer remains within the linear range of the transducer for providing accurate and reliable measurements when in operation. Thus, the hallmark for providing accurate and reliable measurements relies on providing a transducer which is impervious to the predations of the environment and which does not consume an inordinate amount of the linear range of the transducer.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. PATENT DOCUMENTS | | |
|---|---|---|
| DOCUMENT NO. | DATE | NAME |
| 2,361,348 | October 24, 1944 | Dickson et al. |
| 2,890,505 | June 16, 1959 | Brand |
| 3,932,828 | January 13, 1976 | Plunkett et al. |
| 4,000,877 | January 4, 1977 | Shead et al. |
| 4,162,138 | July 24, 1979 | Byrne |
| 4,377,548 | March 22, 1983 | Pierpont |
| 4,408,159 | October 4, 1983 | Prox |
| 4,419,646 | December 6, 1983 | Hermle |
| 4,470,786 | September 11, 1984 | Sano et al. |
| 4,680,543 | July 14, 1987 | Kohen |
| 4,829,245 | May 9, 1989 | Echasseriau et al. |
| 4,954,307 | September 4, 1990 | Yokoyama |
| 4,959,000 | September 25, 1990 | Giza |
| 5,016,343 | May 21, 1991 | Schutts |
| 5,018,049 | May 21, 1991 | Mehnert |
| 5,021,737 | June 4, 1991 | Schutts |
| 5,039,942 | August 13, 1991 | Buchschmid, et al. |
| 5,049,055 | September 17, 1991 | Yokoyama |
| 5,122,046 | June 16, 1992 | Lavallee et al. |
| 5,133,921 | July 28, 1992 | Yokoyama |
| 5,138,292 | August 11, 1992 | Forster |
| 5,147,657 | September 15, 1992 | Giza |
| 5,151,277 | September 29, 1992 | Bernardon, et al. |
| 5,182,032 | January 26, 1993 | Dickie et al. |
| 5,226,221 | July 13, 1993 | Kilgore |
| 5,240,397 | August 31, 1993 | Fay et al. |
| 5,252,051 | October 12, 1993 | Miyamoto et al. |
| 5,351,388 | October 4, 1994 | Van Den Berg, et al. |
| 5,376,325 | December 27, 1994 | Ormson |

| FOREIGN PATENT DOCUMENTS | | |
|---|---|---|
| DOCUMENT NO. | DATE | COUNTRY |
| UK 1 313 748 | April 18, 1973 | Great Britain |
| UK 1 353 603 | May 22, 1974 | Great Britain |
| JA-139710 | August 6, 1978 | Japan |
| WO 84/03794 | September 27, 1984 | PCT |
| FR 2576-245-A | July 25, 1986 | France |
| JA 6-37130-A | October 2, 1994 | Japan |

The two patents to Schutts and the patent to Van Den Berg, et al. reflect assignee's ongoing commitment to providing an accurate sensor which is impervious to predations of the environment.

The French patent to Jaeger teaches the use of a method and apparatus for injection molding of an elongated detector with a sensor at one end. One end of the detector is supported by the mold while the sensor end is engaged by a centering sleeve (130). The centering sleeve (130) terminates in a piston (132) which is mobile in a cylinder (126) and slides about a fixed rod (138). Thermoplastic is injected into the mold and the centering sleeve is removed from the sensor when the injection process is only partially complete.

The Japanese patent to Kawakami teaches the use of sealing a semiconductor chip by transfer molding. A semiconductor chip (4) is mounted on a carrier (1) and is held at a fixed position via mobile pins (17) and (18). The mobile pins (17) and (18) are movably fitted to a top force (11) and a bottom force (12) for freely advancing or retracting the pins into and out of the cavities (15) and (16). While the pins (17) and (18) are in contact with the carrier (1), a resin (20) is injected into the cavities (15) and (16) through gates (13) and (14) and the pins (17) and (18) are gradually retracted in accordance with the injecting state of resin (20).

The patent to Yokoyama teaches the use of an apparatus for manufacturing plastic encapsulated electronic semiconductor devices. A support pad (11) is firmly fixed by first and second sliders (24A) and (24B) and also by mold halves (19) and (20). The first and second sliders (24A) and (24B) are moved outwardly of a cavity (25) when the cavity is half filled with the plastic encapsulating material. Spaces, which are formed after movement of the sliders, are filled with the plastic encapsulating material directly poured through a gate (23). It should be noted that the sliders (24A), (24B) perform two functions in the cavity (25). The first function is to firmly grasp a thin end portion of the support pad (11) thereby fixing same in position and the second function is to narrow a passage through the gate (23).

The patent to Pierpont teaches the use of a method for encapsulating an electrical component having radial leads. A large multi-cavity mold is loaded with a plurality of horizontal radially leaded capacitors. The closed mold grips the leads (15). A top pin (25) pushes each component body downward a predetermined degree so that each body is left in about the same position within the corresponding mold cavity. A bottom pin (28) then pushes each component body upwardly only slightly above a center of the mold cavity so that upon bottom pin withdrawal, stresses within the lead wires of the electrical component cause the component bodies to spring back just to the mold cavity center portion. Molding resin is then introduced.

The other prior art listed above, but not specifically discussed, teach other sensor devices and molding processes and further catalog the prior art of which the applicant is aware. These references diverge even more starkly from the references specifically distinguished above.

SUMMARY OF THE INVENTION

The present invention is distinguished over the known prior art in a multiplicity of ways. For one thing, the present invention provides a transducer including a protective seamless encapsulation ensconcing a sensing element at one end and a cable extending out of the other end. In addition, the sensing element is symmetrically disposed about a long axis of the transducer and the seamless encapsulation includes an integrally formed protective wall having an uniform thickness along a forwardmost portion of the sensing element.

Preferably, the sensing element is in the form of a sensing coil having a center void, a front face, a back face and at least a first lead and a second lead extending from the sensing coil and spaced from one another. The cable is preferably a triaxial cable comprised of an outer protective jacket circumscribing an interior of the cable which includes three concentrically disposed conductors separated from one another by at least two concentrically disposed insulators. Specifically, the outer protective jacket circumscribes the concentrically disposed triaxial, coaxial and center conductors which are in turn separated from one another by an insulator and a dielectric interposed between the triaxial and coaxial conductors and the coaxial and center conductors, respectively. At least one end of the cable is stripped in a step-like fashion to expose a length of the center conductor, the dielectric, the coaxial conductor, the insulator and the triaxial conductor.

In addition, the encapsulated transducer includes a front ferrule having a bore with an inner diameter substantially equal to the outer diameter of the center conductor and a rear ferrule having a bore with an inner diameter substantially equal to the outer diameter of the coaxial conductor.

A component alignment preform is molded in a single step. The component alignment preform includes an annular recess having a center post axially aligned with the front and rear ferrules which are bonded to the preform and linearly spaced apart along a long axis of the preform.

Once the preform has been molded, the sensing coil is placed over the center post and in the annular recess. The sensing coil is then electrically connected to the ferrules. This is accomplished by resistance welding the first lead of the sensing coil to the front ferrule and the second lead of the sensing coil to the rear ferrule.

Then, the stripped end of the cable is inserted into the bores of the molded together front and rear ferrules. The center conductor is mechanically and electrically connected to the front ferrule and the coaxial conductor is mechanically and electrically connected to the rear ferrule thereby forming a sensing coil and cable assembly. A protective sleeve is transfer molded over the sensing coil and interlocked with the preform, thus forming a sleeved coil and cable assembly. The transfer molded protective sleeve does not cover the front face of the coil.

Once the process of forming the sleeved coil and cable assembly is completed, the sleeved coil and cable assembly is ready to be encapsulated using an injection molding process. The injection mold is defined by an upper mold plate having an upper cavity and a lower mold plate having a lower cavity. The upper and lower cavities form a mold cavity when in the closed position which is complementary to the desired form of the encapsulation of the coil and cable assembly. The mold cavity is defined by an upper wall, a lower wall, a front wall and a back wall having an opening extending therethrough. Preferably, the upper mold plate and the lower mold plate are each provided with at least one slideable support pin which extends into the respective upper or lower cavity of the mold and when retracted remain flush with the respective upper or lower wall of the mold cavity. In addition, a slideable locator pin is provided adjacent the front wall of the mold cavity and is capable of extending into and out of the lower cavity when the mold is in an opened position.

The sleeved coil and cable assembly is placed into the lower cavity of the lower mold plate such that the cable of the sleeved coil and cable assembly extends out the opening of the back wall of the mold cavity. At least one slideable support pin is extended into the lower cavity of the lower mold plate and is placed in engagement with a portion of the sleeved coil and cable assembly therein. This supports and centers the sleeved coil and cable assembly within the mold cavity. In addition, the slideable locator pin is extended into the mold cavity such that it properly locates the sensing coil within the mold cavity and helps space it a predetermined distance from the front wall of the mold cavity. Once the slideable locator pin and at least one slideable support pin has centered the coil and spaced it a predetermined distance from the front wall of the mold cavity, the locator pin is withdrawn and the injection mold is closed. At least one slideable support pin in the upper mold plate is extended into the upper cavity and comes into engagement with a portion of the sleeved coil and cable assembly when the injection mold is closed. This provides additional means for supporting and centering the assembly within the mold cavity such that there is a void completely surrounding the assembly (except of course where the pins are touching the assembly). Note that the location and the number of slideable support pins may be configured to best support the assembly being encapsulated within the cavity.

Once the mold is in the closed position a self-bonding moldable material is injected into the mold cavity via runners and gates. This process is continued until the mold cavity is completely filled and the coil and cable assembly is completely ensconced within the moldable material. The slideable support pins are then retracted flush with the respective upper and lower walls of the mold cavity prior to the moldable material solidifying. Note that an additional charge of moldable material may be injected into the mold as the support pins are being withdrawn so as to accommodate for any additional material needed to completely fill the voids left by the previously extended support pins. Once the process of injecting the moldable material into the cavity is completed and the support pins have been retracted, the mold may be opened and the encapsulated transducer allowed to cool in the lower mold plate. Once the encapsulated transducer is cooled one or more bottom support pins may be actuated to eject the encapsulated transducer therefrom. Preferably the moldable material is polyphenylene sulfide (PPS) which has the characteristic of bonding to itself.

OBJECTS OF THE INVENTION

It is a general object of the present invention to provide an improved transducer and a method of manufacturing such transducer.

A primary object of the present invention is to provide improved encapsulated transducers with an integrally formed sleeve and a component alignment preform and method of manufacturing same.

A further object of the present invention is to provide an encapsulated transducer as characterized above which has an injection molded seamless encapsulation ensconcing a sensing coil at one end and a cable extending out of the other end, one end of the cable being electrically connected to the sensing coil within the encapsulation and the other end connected to an electrical processing unit distal from said encapsulation.

Another further object of the present invention is to provide an encapsulated transducer as characterized above wherein the encapsulation provides a seamless sealing envelope around the sensing coil and an end portion of the cable, thus providing an impervious seal against any mechanical, physical or chemical aggressions from the surrounding medium.

Another further object of the present invention is to provide an encapsulated transducer as characterized above wherein the sleeved coil and cable assembly is centered within the encapsulation and wherein a distance between the front face of the sensing coil and a front face of the encapsulation is held to a very close tolerance which is reproducible from one transducer to another in mass production.

Another further object of the present invention is to provide an encapsulated transducer as characterized above which is comparatively less expensive to manufacture than existing transducers for use in monitoring and diagnosing the status of rotating and reciprocating machinery and which also lends itself to rapid mass production techniques.

Another further object of the present invention is to provide a preform which substantially axially aligns the sensing coil with the front and rear ferrules and the respective conductors of the cable.

Another further object of the present invention is to provide an integrally formed protective sleeve which interlocks with the preform and circumscribes the coil and its associated leads, thus forming a sleeved coil and cable assembly.

Another further object of the present invention is to provide an encapsulated transducer as characterized above wherein the encapsulation strongly bonds to the sleeved coil and cable assembly for providing a leak tight seal and resisting axial forces applied to the encapsulation or cable which may cause the electrical connections to completely or partially break resulting in an inoperative or unreliable transducer.

Another further object of the present invention is to provide an encapsulated transducer as characterized above which is capable of being mass produced with reproducible operational characteristics without appreciable alterations of the signals they admit when in operation.

Another further object of the present invention is to maintain a predetermined linear range capability for each manufactured transducer.

Another further object of the present invention is to provide a slideable locator pin which centers the coil within the mold cavity and spaces the front face of the coil from the front wall of the mold cavity prior to the injection molding process.

Another further object of the present invention is to provide a plurality of slideable support pins for supporting and centering the sleeved coil and cable assembly during the injection molding process and for rigidly maintaining the spacing of the front face of the coil from the front wall of the mold cavity.

Viewed from a first vantage point it is an object of the present invention to provide an information transmitting sensor and housing comprising: a sensing element; a cable coupled to the sensing element; a monolith of cured moldable material ensconcing both the sensing element and a portion of the cable to define a seamless mass circumscribing the sensing element up to the cable.

Viewed from a second vantage point it is an object of the present invention to provide an encapsulated transducer for use in monitoring the status of rotating equipment in a harsh environment with a component alignment preform having a leading end with an active element and a trailing end with an information transmitting medium emanating therefrom, formed by: molding a protective sleeve over said active element and a portion of said component alignment preform; integrally forming a locating means proximate the active element; locating the active element in a mold cavity with the locating means coupled thereto, assuring proper registry in the mold cavity; integrally forming a supporting means proximate the component alignment preform; further supporting and locating the active element and the component alignment preform in the mold cavity with the support means and removing the locator means; molding over the active element, the protective sleeve, the preform and a portion of the information transmitting medium with a moldable material except for an area of support; removing the support means; injecting moldable material adjacent the support means for filling in the areas heretofore occupied by the support means, whereby said active element is precisely located in a moldable material to accurately address the rotating equipment.

Viewed from a third vantage point it is an object of the present invention to provide a transducer for monitoring the status of rotating equipment wherein a shaft of the rotating equipment is exposed to the transducer, comprising, in combination: means for mounting the transducer a distance from the shaft such that a tangent of the shaft is perpendicular to a long axis of the transducer, the transducer having a sensing coil located proximate the shaft, a front portion of the transducer including a protective wall having uniform thickness along a forwardmost portion of the sensing coil, the sensing coil symmetrically disposed about the long axis, and a protective seamless encapsulation including a full length sleeve integrally formed with the protective front wall ensconcing the sensing coil and a leading portion of a cable operatively coupled to the sensing coil, the cable extending away from the transducer to an electrical processing unit.

Viewed from a fourth vantage point it is an object of the present invention to provide a process for making a transducer, comprising the steps of: providing a sensing coil having a center void, a front face, a rear face and at least a first lead and a second lead extending from the sensing coil; providing a cable having at least one outer conductor surrounding at least one insulator carrying at least one center conductor; stripping an end of the cable in a step-like fashion to expose a portion of the center conductor, the insulator and the outer conductor; forming a front and rear pair of ferrules with the front ferrule having a bore with a diameter substantially matching the diameter of the center conductor and the rear ferrule having a bore with a diameter substantially matching the diameter of the outer conductor; molding together in linearly spaced proximity with a self-bonding moldable material the front and rear ferrules and providing in such molding step an annular recess near the front ferrule and linearly aligned therewith and a chamber interposed between and in open communication with the front and rear ferrules, thereby forming a component alignment preform; inserting the coil in the annular recess and electrically connecting the first lead to the front ferrule and the second lead to the rear ferrule; inserting the stripped cable end into the bores of the molded together front and rear ferrules and mechanically and electrically connecting the outer conductor to the rear ferrule and the center conductor to the front ferrule, thereby forming a sensing coil and cable assembly; molding a sleeve over the sensing coil and a portion of said component alignment preform thereby forming a sleeved coil and cable assembly; supporting and centering the sleeved coil and cable assembly within a mold cavity with at least one slideable support; orienting the cable to extend out from the mold cavity; locating the sensing coil within the mold cavity and spacing the front face of the sensing coil a distance from a front wall of the mold cavity with at least one slideable locator and at least one slideable support; retracting the slideable locator from the mold cavity; injecting the self-bonding moldable material into the cavity of the mold to precisely ensconce the sleeved coil and cable assembly and providing a precise face thickness covering the face of the coil; retracting the slideable supports from the sleeved coil and cable assembly so that the self-bonding moldable material will flow into the areas heretofore occupied by the slideable supports; allowing the moldable material to set; and removing the thus formed transducer from the mold cavity as an integrated unit having a seamless mass of moldable material ensconcing the sleeved coil and cable assembly.

These and other objects will be made manifest when considering the following detailed specification when taken in conjunction with the appended drawing figures.

BRIEF DESCRIPTION OF THE DRAWINGS

FIG. 6 is a diagrammatic view of an assembly step of the present invention and a cross-sectional view of the combination of the elements of FIG. 4.

FIG. 7 is a partial sectional view of the combination of the elements of FIG. 6 forming a coil and cable assembly.

FIG. 8 is a partial sectional view of a sleeve integrally formed with the coil and cable assembly shown in FIG. 7.

DESCRIPTION OF PREFERRED EMBODIMENTS

Figure 1:
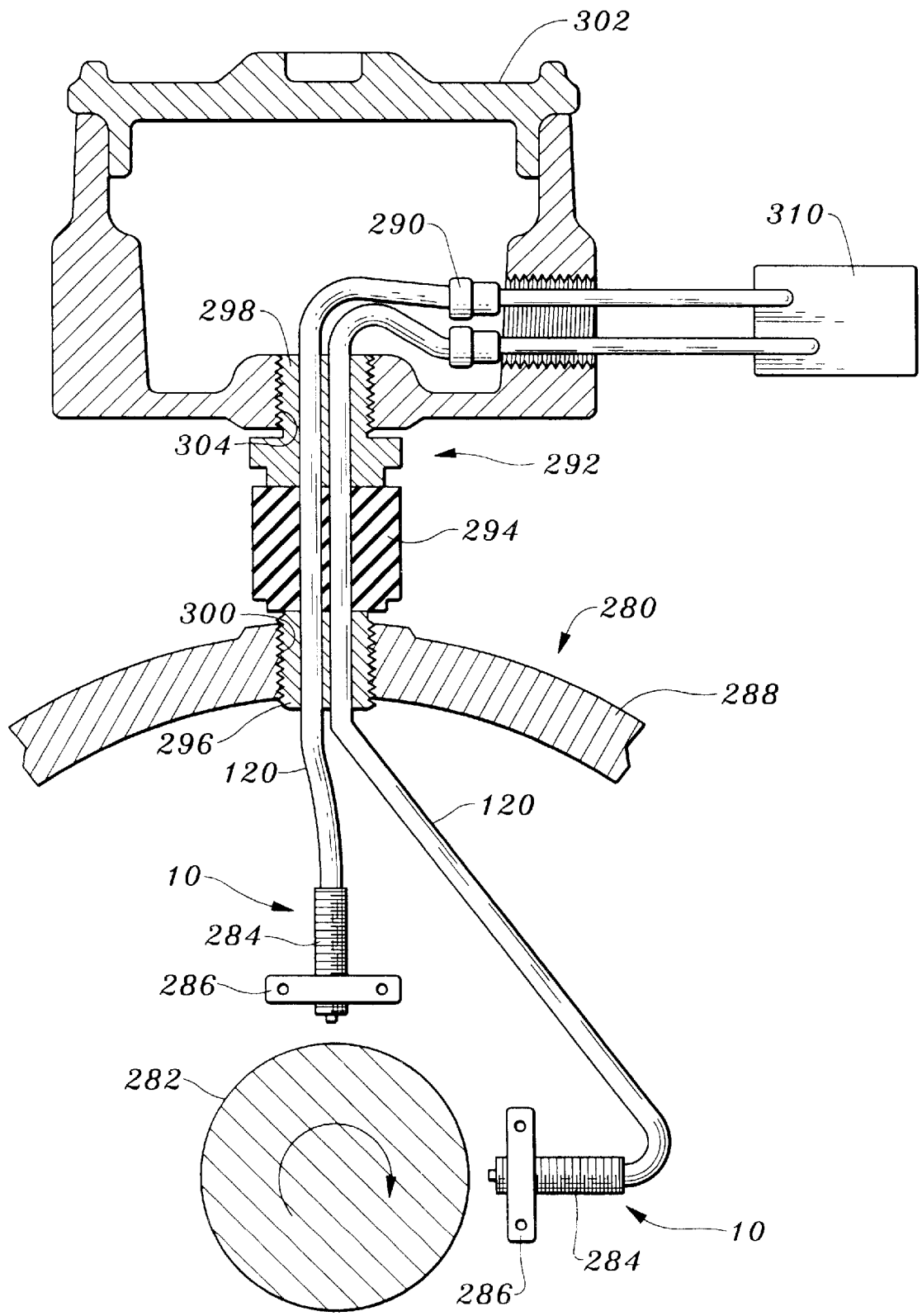
FIG. 1 is an elevational view of an encapsulated transducer with an integrally formed sleeve and a component alignment preform according to the present invention which is juxtaposed to a rotating shaft of a machine for monitoring the vibration thereof.

Considering the drawings, wherein like reference numerals denote like parts throughout the various drawing figures, reference numeral 10 is directed to the encapsulated transducer with a component alignment preform according to the present invention.

Figure 2:
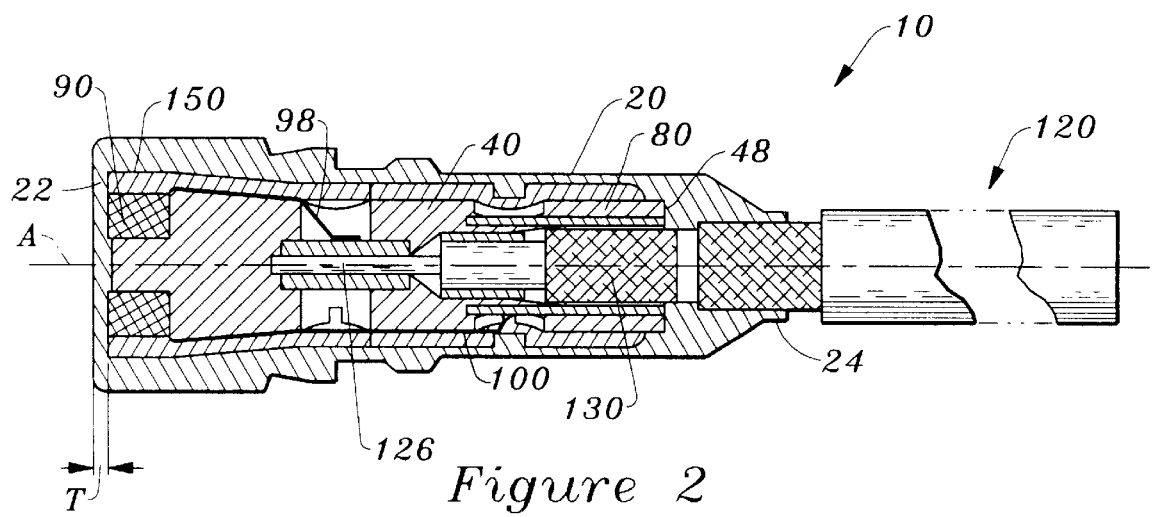
FIG. 2 is a partial sectional view of the encapsulated transducer with the integrally formed sleeve and component alignment preform according to the present invention.

In essence, and referring to FIGS. 2 and 6, the encapsulated transducer 10 includes an injection molded encapsulation 20 having a front end 22 and a back end 24. The encapsulation 20 is a monolith of cured moldable material ensconcing a sensing element 90 proximate the front end 22 and a portion of an information transmitting medium 120 emanating from the back end 24. A component alignment preform 40 operatively couples the sensing element 90 with the information transmitting medium or cable 120. The component alignment preform 40 includes a front ferrule 70 and a rear ferrule 80 bonded thereto and linearly spaced apart along a long axis "A". The component alignment preform 40 further includes an annular recess 44 (FIG. 3) in which the sensing element or coil 90 is placed so that it is linearly spaced and aligned along the common long axis "A" in which the front and rear ferrules 70, 80 are aligned. A first lead 98 (FIGS. 4 and 5) of the coil is electrically connected to the front ferrule 70 and a second lead 100 of the coil 90 is electrically connected to the rear ferrule 80. A back end 48 of the component alignment preform 40 receives a stripped end 122 (FIG. 6) of the cable 120 such that a center conductor 126 mates with the front ferrule 70 and a coaxial conductor 130 mates with the rear ferrule 80. The respective conductors 126, 130 are electrically and mechanically connected to the pair of front and rear ferrules 70, 80. A protective "full length" sleeve 150 (FIG. 2) is transfer molded over the coil 90 and interlocked with the preform 40 thereby forming a sleeved coil and cable assembly 170 (FIG. 8). This sleeved coil and cable assembly 170 is encapsulated by an injection molding process which provides the durable encapsulation 20 (FIG. 2) which bonds with itself and with the sleeved coil and cable assembly 170. The sleeved coil and cable assembly 170 is symmetrically disposed within the encapsulation 20 and the encapsulation 20 includes an integrally formed protective wall having an uniform thickness "T" along a forwardmost portion of the sensing element 90.

Figure 3:
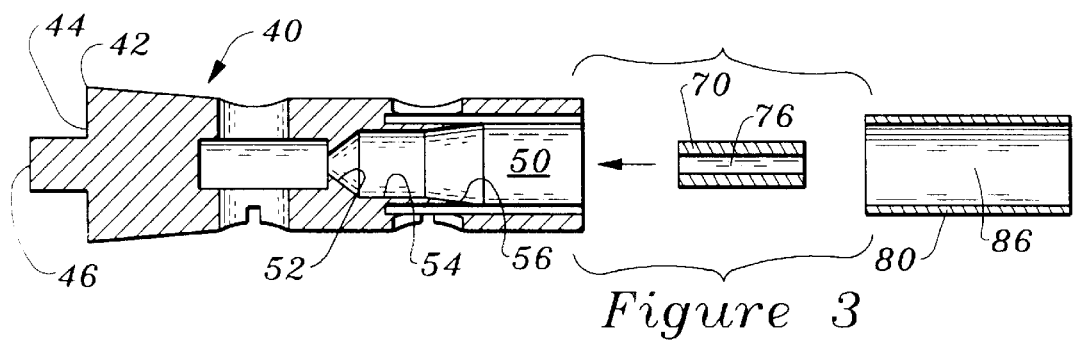
FIG. 3 is a cross-sectional exploded parts view of the component alignment preform.
Figure 4:
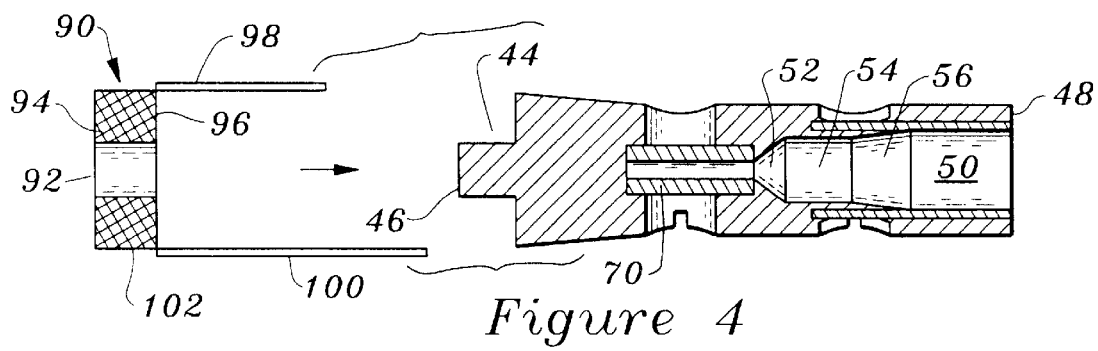
FIG. 4 is a cross-sectional view of a sensing coil and the component alignment preform formed by the combination of the elements of FIG. 3.

More specifically, and referring to FIGS. 3 and 4, the component alignment preform 40 is formed in a first injection molding process where the moldable material is preferably polyphenylene sulfide (PPS). The PPS material is a dielectric and thus an electrical insulating material which has the characteristic of bonding to itself. The front and rear ferrules 70, 80 are preferably placed on a pin support within a mold and the PPS material is molded around the front and rear ferrules 70, 80 thereby forming the component alignment preform 40 as shown in FIG. 4. The front and rear ferrules 70, 80 are inner-locked and linearly spaced apart along the long axis "A" by the PPS material. A front end 42 of the preform 40 includes an annular recess 44 having a center post 46 axially aligned with the front and rear ferrules 70, 80. The preform 40 further comprises a chamber 50 including a bridging section 54 of constant cross-sectional area traversing between a front and a rear truncated cone 52, 56 which isolate the front and rear ferrules 70, 80. The front ferrule 70 includes a bore 76 with an inner diameter substantially equal to the outer diameter of the center conductor 126. The rear ferrule 80 includes a bore 86 with an inner diameter substantially equal to the outer diameter of the coaxial conductor 130. The ferrules 70, 80 are preferably formed from brass.

Figure 5:
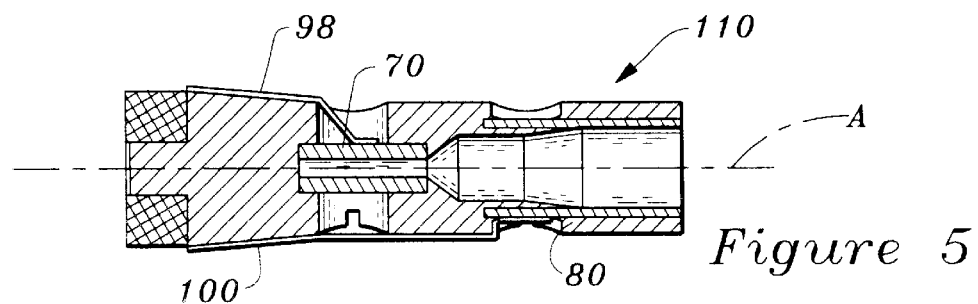
FIG. 5 is a cross-sectional view of the combination of the elements of FIG. 4.

Referring to FIGS. 4 and 5, the sensing element 90 is preferably a sensing coil 90 comprised of a center void 92, a front face 94, a back face 96, a body 102 and first and second leads 98, 100 extending from the coil 90 and spaced from one another. Once the component alignment preform 40 has been formed, the sensing coil 90 may be electrically connected to the respective ferrules 70, 80 of the preform 40. This is accomplished by placing the sensing coil 90 within the annular recess 44 of the preform such that the post 46 extends a distance within the center void 92 of the coil 90. The first lead 98 is then preferably induction welded to the front ferrule 70 and the second lead 100 is preferably induction welded to the rear ferrule 80, thus forming a coil and preform assembly 110. Next, the cable 120 is electrically and mechanically connected within the preform 40.

Referring to FIGS. 6 through 8, the cable 120 is preferably a triaxial cable comprised of an outer jacket 136 circumscribing an interior of the cable which includes three concentrically disposed conductors 126, 130 and 134 separated from one another by at least two concentrically disposed dielectrics or insulators 128, 132. More specifically, the outer protective jacket 136 circumscribes the concentrically disposed triaxial, coaxial and center conductors 134, 130 and 126 which are separated from one another by an insulator 132 and a dielectric 128 interposed between the triaxial and coaxial conductors 134, 130 and the coaxial and center conductors 130, 126, respectively. At least one end 122 of the cable 120 is stripped in a step-like fashion to expose a length of the center conductor 126, the dielectric 128, the coaxial or outer conductor 130, the insulator 132 and the triaxial conductor 134.

Referring to FIG. 6, solder paste 140 is inserted into the bore 76 of the front ferrule 70 preferably, via a syringe which is pneumatically driven so as to dispense an uniform predetermined amount of paste 140 which is reproducible every time. A solder ring 142 is placed onto the stripped end 122 of the cable 120. The solder ring 142 encircles the coaxial conductor 130 and abuts the insulator 132 which is interposed between the coaxial and triaxial conductors 130, 134. An elastomeric sleeve 144 is placed over the dielectric 128 of the cable 120 and includes an inner diameter which substantially matches the outer diameter of the dielectric 128. The elastomeric sleeve 144 may be of an insulating material such as fluorosilicone rubber. The elastomeric sleeve 144 has an outer diameter which is slightly larger than the bridging section 54. The cable 120 is then inserted into the back end 48 of the component alignment preform 40 such that the center conductor 126 fits within the bore 76 of the front ferrule 70 and the coaxial conductor fits within the bore 86 of the rear ferrule 80. An axial force exerted as shown by the arrows $F_1$ and $F_2$, deform the elastomeric sleeve 144 against the conical transition between the bridging section 54 and the rear truncated cone 56. This provides a tight seal between this transition area and the dielectric 128 of the cable 120 as shown in FIG. 7. A permanent mechanical and electrical connection is made between the coaxial conductor 130 and the bore 86 of the rear ferrule 80 and also between the center conductor 126 and the bore 76 of the front ferrule 70. Use of inductive heating with the above forces $F_1$, $F_2$ being applied, the solder paste 140 and solder ring 142 melt and flow over the exposed conductors 126, 130 affixing them permanently throughout their length to the bores 76, 86 of the front ferrule 70 and the rear ferrule 80 respectively. Of course, rather than solder, an adhesive or welding may be used. Note that the preformed amount of solder paste 140 and the preformed solder ring 142 provide effective repeatability of the electromagnetic characteristics of the entire encapsulated transducer 10, especially with respect to the inductance parameter of the sensing coil 90 which as illustrated is relatively close to the center conductor 126.

Referring to FIGS. 7 and 8, the protective sleeve 150 is transfer molded over the coil 90 and its associated leads 98, 100 and interlocked with the preform 40. This is accomplished by preferably placing the coil and cable assembly 112 into a transfer mold such that the front face 94 of the coil 90 abuts a wall of the mold so as not to allow transfer moldable material to cover the front face 94 of the coil 90. The transfer moldable material is gently emitted into the transfer mold at a force which allows the material to flow over the coil 90 and its associated leads 98, 100 without deforming or destroying the coil 90, the leads 98, 100 or the connection between the respective leads 98, 100 and the front and rear ferrules 70, 80. Thus, by transfer molding the protective sleeve 150 without deforming or destroying the coil 90 mechanically, the original electrical characteristics which the coil and cable assembly 112 had prior to integrally forming the protective sleeve 150 therewith are retained.

The transfer molded protective sleeve 150 includes a first end 152 which is molded flush with the front face 94 of the coil 90 and a second end 154 preferably terminating proximate the back end 48 of the preform 40. A body 156 of the sleeve 150 traverses from the first end 152 to the second end 154. The body 156 takes on the contour of both the preform 40 and the body 102 of the coil 90 thereby eliminating any gaps between the protective sleeve 150 and both the preform 40 and the body 102 of the coil 90. Furthermore, the transfer molded sleeve 150 fills in the front and the rear passages 58, 60 of the preform 40. By filling in the front and rear passages 58, 60 the sleeve ensconces the leads 90, 100 of the coil 90 which drops down the respective passages 58, 60 and connects with the respective front and rear ferrules 70, 80. As a result of the protective sleeve filling in the gaps and passages 58, 59, 60, 61 of the preform 40, the protective sleeve mechanically locks into the coil and cable assembly 112 thus becoming an integral part thereof. Preferably, the protective sleeve 150 preferably includes a peripheral groove having an upper groove portion 158 opposed from a lower groove portion 160. The two grooves 158, 160 are integrally formed in the body 156 of the sleeve 150 at a precise distance "L" from the front face 94 of the coil 90. When manufacturing a plurality of transducers 10 this distance "L" is accurately reproducible from one transducer to the next as a result of the transfer molded protective sleeve 150 being able to accommodate for any fluctuation in the size of each coil 90 and preform 40. The grooves 158, 160 are used in the injection molding process to accurately control the face thickness "T" of the encapsulation 20. Once the sleeved coil and cable assembly 170 (FIG. 8) is formed, it is ready to be encapsulated.

Figure 9:
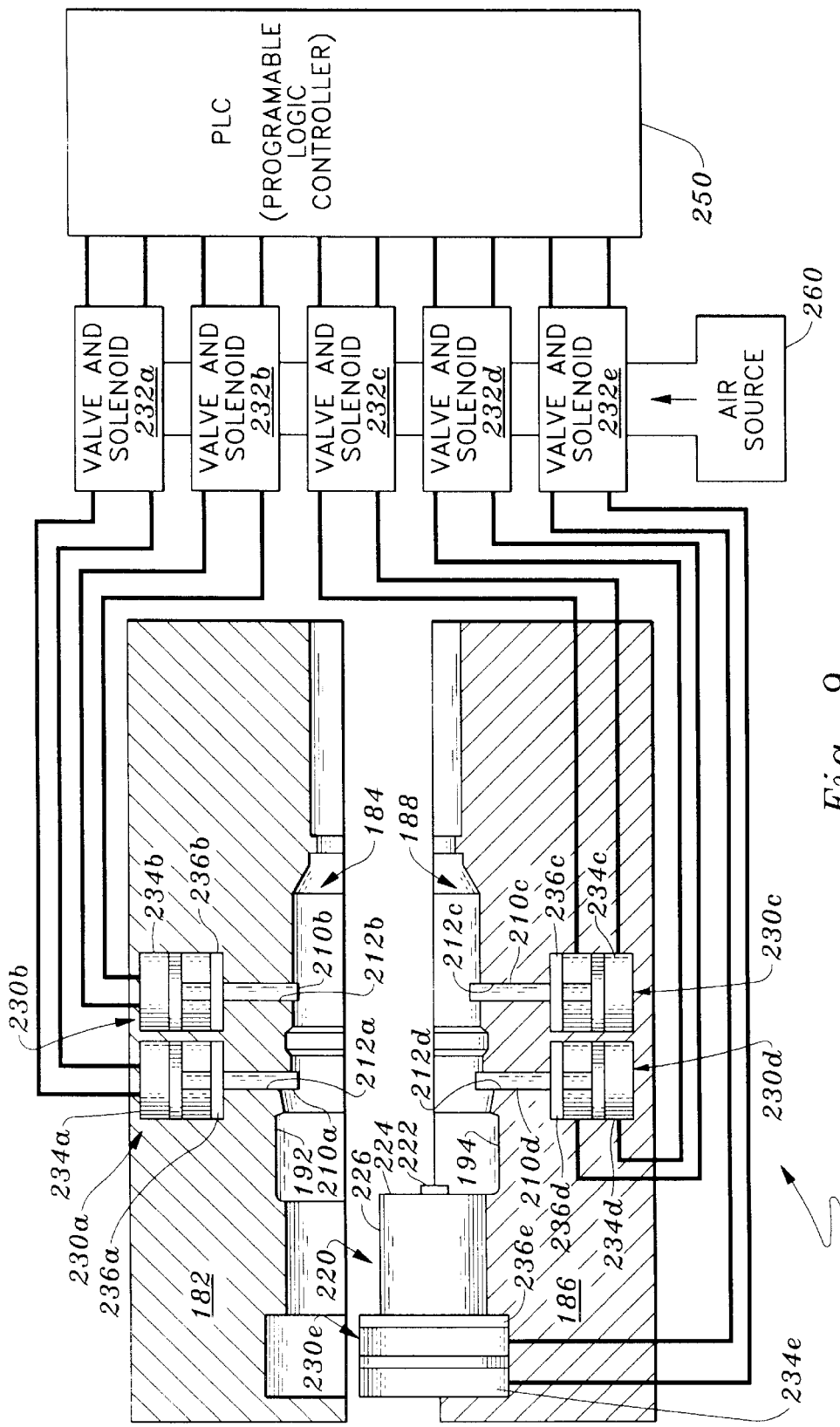
FIG. 9 is a simplified cross-sectional view of a mold in an open position and having all included slideable support and locator pins in an extended position.
Figure 11:
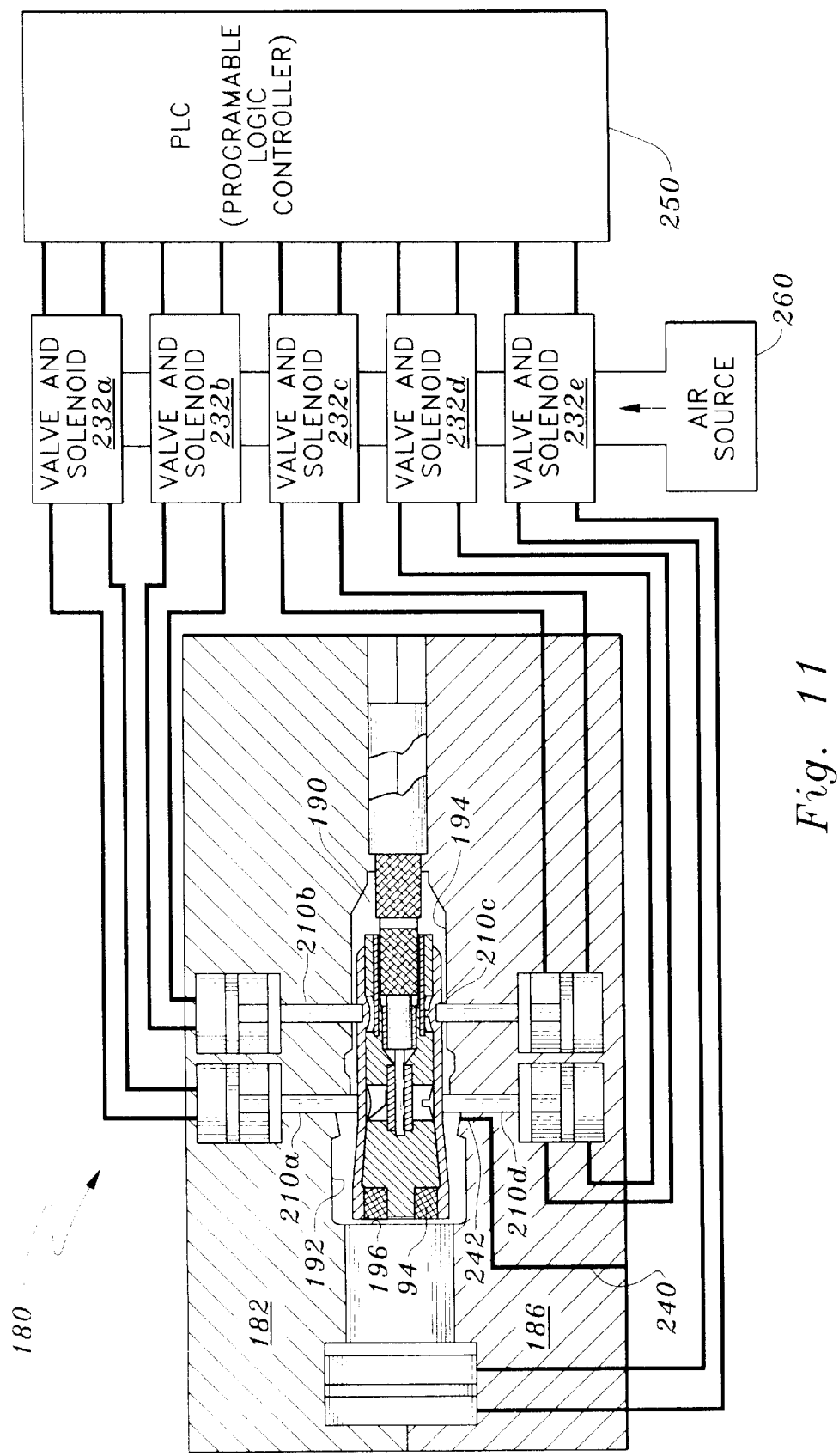
FIG. 11 is a simplified cross-sectional view of the mold in a closed position with the slideable locator pin retracted from engagement of the sensing coil.

Referring to FIGS. 9 and 11, an injection mold 180 is defined by an upper mold plate 182 having an upper cavity 184 and a lower mold plate 186 having a lower cavity 188 forming a single mold cavity 190 when in the closed position. The mold cavity 190 is shaped complementary to the desired form of the encapsulation 20 ensconcing the sleeved coil and cable assembly 170. The mold cavity 190 is defined by an upper wall 192, a lower wall 194, a front wall 196 and a back wall 198 having an opening 200 extending therethrough.

The upper mold plate 182 is preferably provided with a pair of sleeves 212a, 212b through which a pair of slideable support pins 210a, 210b may be moved into or out of the upper cavity 184 by corresponding drive means 230a, 230b. The lower mold plate 186 is preferably provided with a pair of sleeves 212c, 212d through which a pair of slideable support pins 210c, 210d may be moved into or out of the lower cavity 188 by corresponding drive means 230c and 230d. In addition, the injection mold 180 is provided with a slideable locator pin 220 which is preferably disposed on the lower mold plate 186 at a location adjacent the front wall 196 of the mold cavity 190. The slideable locator pin 220 preferably includes a pair of concentrically disposed slideable pins 222, 224 in which an inner pin 222 slides within an outer pin 224 which in turn slides within a sleeve 226. Both the inner pin 222 and the outer pin 224 may be moved by an associated drive means 230e such that they are capable of extending into or out of the lower cavity 188 when the mold 180 is in the opened position. Preferably, the inner pin 222 is capable of extending further into the lower cavity 188 than the outer pin 224.

Alternatively, the slideable locator pin 220 may be an integrally formed T-shaped pin having a top branch resembling the outer pin 224 and a base branch resembling the inner pin 222 in an extended and rigidly fixed position with respect to the top branch.

The slideable support pins 210a—210d and the slideable locator pin 220 are each preferably provided with separate drive means, 230a–230e respectively and may be independently controlled by a programmable logic controller (PLC) 250 or the like.

Each drive means 230a–230e includes a valve and solenoid unit 232a–232e, a pneumatic cylinder 234a–234e and an ejector plate 236a–236e. Each ejector plate 236a–236d is connected to each respective support pin 210a –210d and ejector plate 236e is connected to locator pin 220. Each ejector plate 236a–236e is received within the corresponding pneumatic cylinder 234a–234e which in turn is connected to the corresponding valve and solenoid unit 232a–232e. Each valve and solenoid unit 232a–232e is electrically connected to the PLC 250 and mechanically connected to a gas source 260. The PLC 250 independently sends out an electrical signal to each solenoid of each valve and solenoid unit 232a–232e. Each solenoid receives the signal and physically opens and closes the corresponding valve. This allows gas to be sent to each respective pneumatic cylinder 234a–234e and depending on the location of each ejector plate 236a–236e will cause each support pin 210a –210d and locator pin 220 to extend into or retract out of the mold cavity 190. The ejector plate 236e may be coupled to the inner pin 222 such that the inner pin 222 extends or retracts a short distance and then catches the outer pin 224 and causes it to correspondingly extend or retract.

When the injection mold 180 is in the closed position only the support pins 210a–210d are used to support and symmetrically locate the sleeved coil and cable assembly 170 within the mold cavity 190 (FIG. 11). However, the retracted locator pin may form the front wall 196 of the mold cavity 190. The support pins 210b and 210c are received in the respective upper and lower grooves 158, 160 of the protective sleeve 150. This rigidly maintains the precise spacing of the front face of the sensing coil 90 from the front wall 196 of the mold cavity 190. Depending upon the specific assembly 170 configuration and the way molten moldable material is filling around the assembly 170, one of the support pins may be retracted sooner than another. Retracting the support pins is sequenced with the timing in the PLC 250 and may be calibrated until all of the support pins 210a–210d retract in a manner which allows the assembly 170 to remain centered both radially and axially within the mold cavity 190 and allows a constant spacing between the front wall 196 of the mold cavity 190 and the front face 94 of the coil 90. Note that if the retraction of the support pins 210a–210d is not sequenced correctly the assembly 170 may shift to one side or the other in the mold cavity 190. This may cause an alteration of the electrical characteristics of the encapsulated transducer 10.

Figure 10:
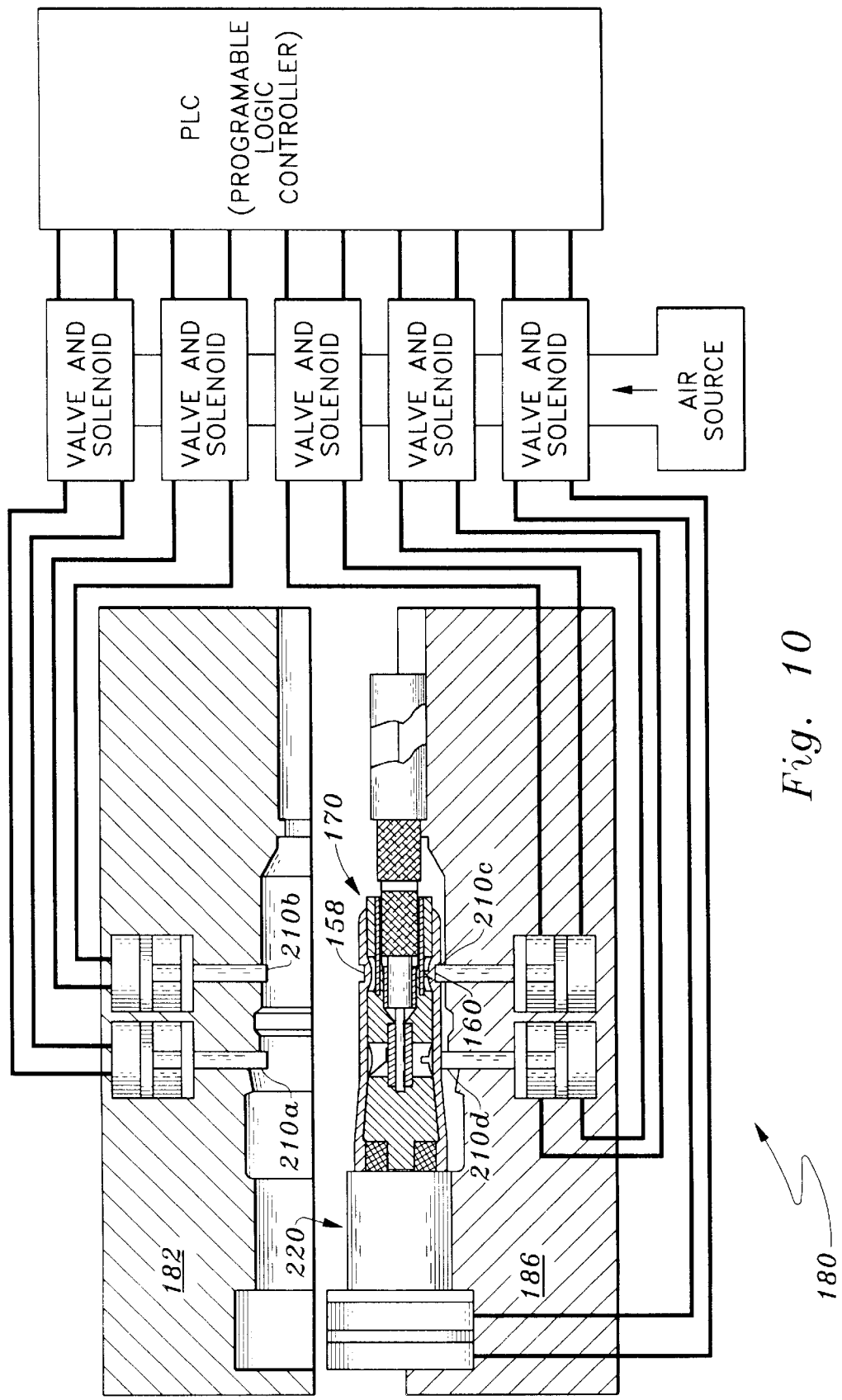
FIG. 10 is a view of the mold of FIG. 9 with the slideable support pins centering and supporting that which is shown in FIG. 8.

Referring to FIG. 10, the sleeved coil and cable assembly 170 is radially and axially centered by way of the extended support pins 210c, 210d and an extended locator pin 220. The locator pin 220 centers the coil 90 and helps space it a predetermined distance from the front wall 196 of the mold cavity 190 by way of the inner pin 222 being partially received within the void 92 of the coil 90 and the outer pin 224 abutting against a front face 94 of the coil 90. In addition, support pin 210c is extended into the lower cavity 188 and is received in the lower groove 160 of the preform 40 for spacing the front face 94 of the sensing coil 90 a precise distance from the front wall 196 of the mold cavity and for providing support thereto. Support pin 210d also extends into the lower cavity 188 and is placed in engagement with the protective sleeve 150 thus providing support thereto. Once the sleeved coil and cable assembly 170 has been symmetrically centered within the lower cavity 188, the locator pin 220 is withdrawn and the mold cavity 190 is placed in a closed position (FIG. 11).

At this time, the slideable support pin 210b is received in the upper groove 158 of the preform 40 and works in combination with support pin 210c for rigidly maintaining the precise spacing of the front face 94 of the sensing coil 90 from the front wall 196 of the mold cavity 190. This allows the encapsulated traducers 10 to include an integrally formed protective wall having an uniform thickness "T" (FIG. 2) and thus, a predetermined linear range. This is particularly important when manufacturing a plurality of encapsulated transducers 10 which are suppose to have the same electrical characteristics. Furthermore, once the mold 180 is closed the cable 120 extends out of the opening 200 in the back wall 198 of the mold cavity 190. The engagement of the upper mold plate 182 and the lower mold plate 186 provides additional support by having the cable 120 cantilevered therebetween. Support pin 210a extends into the upper cavity 184 from the upper mold plate 182 and comes into engagement with the preform 40 of the cable 170 thereby providing further top support to the sleeved coil and cable assembly 170. A void completely surrounds the sleeved coil and cable assembly 170 except of course where the pins 210a–210d are abutting the assembly 170. An alternative embodiment to FIG. 11 may use fewer or more support pins 210a–210d for centering and supporting the sleeved coil and cable assembly 170 in the mold cavity 190.

The moldable material is injected into the mold cavity via runners 240 and gates 242 provided in the lower mold plate 182 and/or the upper mold plate 186. Preferably, one gate is located adjacent each slideable support pin 210a–210d. The moldable material is preferably polyphenylene sulfide (PPS) which has the characteristic of bonding to itself. The injection of the moldable material is continued until the mold cavity 190 is completely filled. Once the mold cavity 190 is filled, the support pins 210a–210d are retracted such that the sleeved coil and cable assembly 170 remains centered within the mold cavity 190. Note that an additional charge of moldable material may be introduced into the mold cavity 190 simultaneously with the retractions of the support pins 210a–210d such that the sleeved coil and cable assembly 170 is completely ensconced within the moldable material and all voids have been filled.

Figure 12:
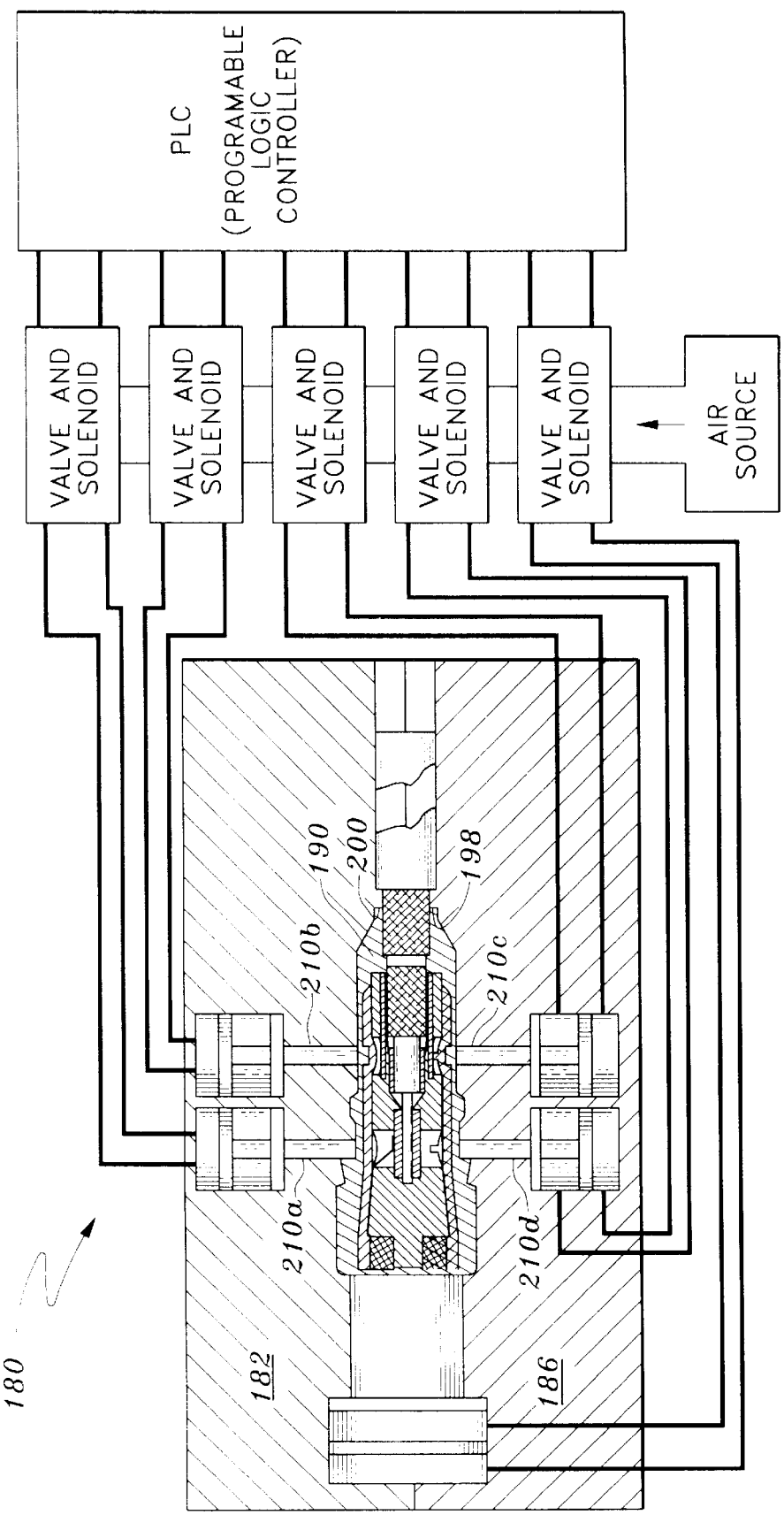
FIG. 12 is a simplified cross-sectional view of the mold in a closed position with the slideable support pins retracted after an injection molding according to the present invention is completed.
Figure 13:
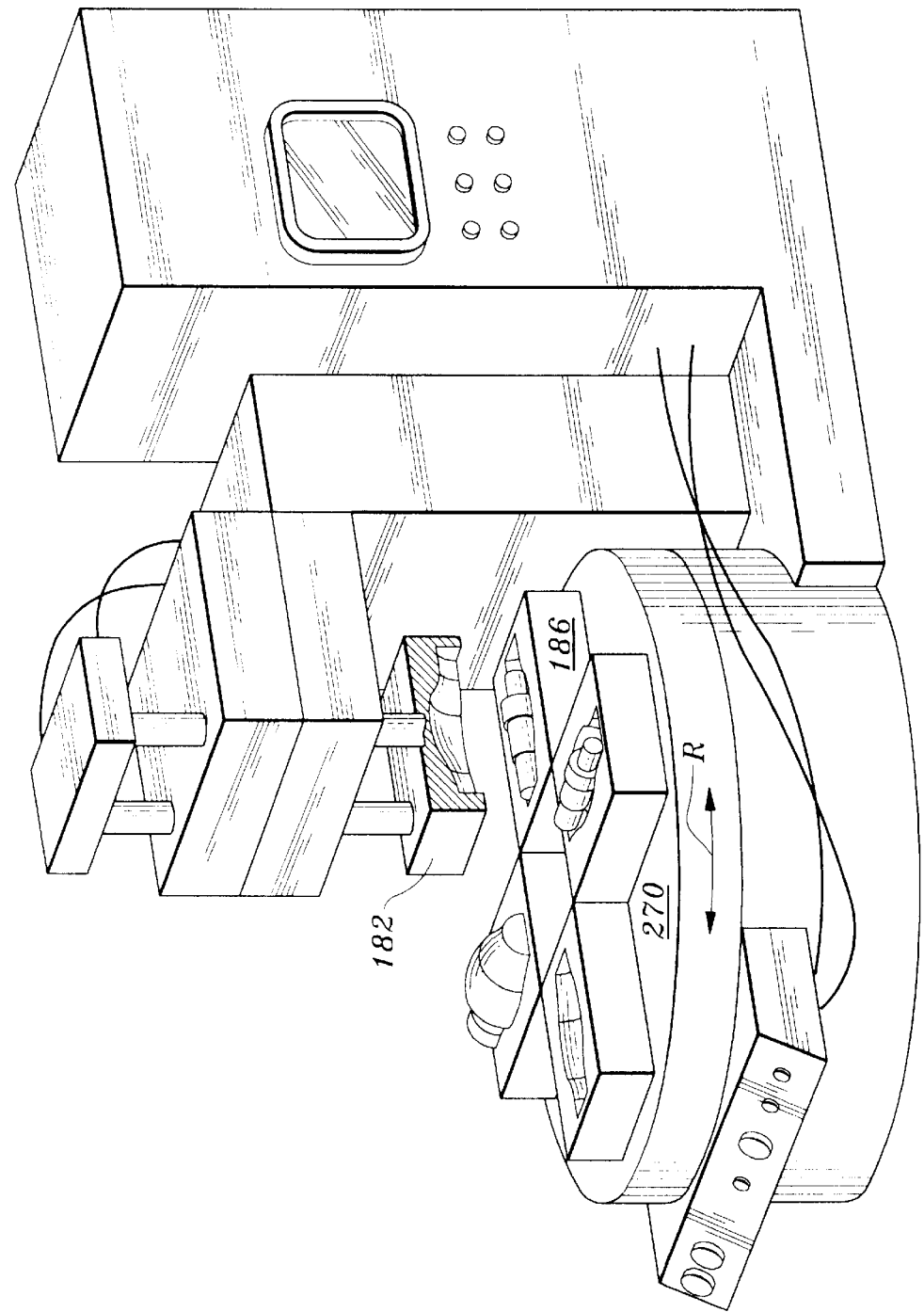
FIG. 13 is an elevational view of an injection mold used to mass produce a plurality of encapsulated transducers sequentially.

Referring to FIG. 12, once the process of injecting the moldable material into the mold cavity 190 is completed and the support pins 210a–210d have been retracted, the mold 180 may be opened and the encapsulated transducer 10 allowed to cool in the lower mold plate 186. Once the encapsulated transducer is cooled one or more of the bottom support pins, 210c, 210d may be actuated to eject the encapsulated transducer 10 therefrom.

In mass production it is preferred that an injection molding device be provided which includes a single upper mold plate 182 and a plurality of lower mold plates 186 disposed on a rotatable table 270 (FIG. 3). The lower mold plates 186 may each be preloaded with a single sleeved coil and cable assembly 170. Then, the upper mold plate 182 comes down onto the first inline lower mold plate 186 and the respective sleeved coil and cable assembly 170 is encapsulated. Once the encapsulation process is completed the upper mold plate 182 is lifted and the table 270 is rotated about arrow "R" to align a subsequent lower mold plate 186 with the stationary upper mold plate 182 so that the encapsulation process may be repeated.

Meanwhile, the previously encapsulated transducer 10 may remain within the lower mold plate 186 and be allowed to cool as the table is rotated and then ejected as delineated above. Now, after the encapsulated transducer 10 is ejected the lower mold plate 186 is reloaded with a sleeved coil and cable assembly 170 and extends back to the upper mold plate 182 as the table 270 is rotated. This process may continue for encapsulating a batch of sleeved coil and cable assemblies 170.

In use and operation, and referring to FIGS. 1 and 2, the encapsulated transducer 10 may, for example, be utilized as a proximity transducer for monitoring the vibrational characteristics of a rotating shaft 282 of a machine 280. In this environment the encapsulated transducer 10 operates on the eddy current principle and outputs a signal correlative to the spacing between the rotating shaft 282 and the sensing coil 90 of the encapsulated transducer 10.

Typically, the encapsulated transducer 10 is circumscribed by a threaded metal case 284 which is mounted adjacent the rotating shaft of the machine 280. A mounting means 286 is used to strategically mount the encapsulated transducer 10 such that the sensing coil 90, proximate the front end 22 of the encapsulation 20, and the rotating shaft 282 are in a juxtaposed relation. The sensing coil 90 is electrically and mechanically connected to the cable 120. The cable 120 extends out the back end 24 of the encapsulation 20 and runs through a casing 288 of the machine 280 where it preferably terminates to a connection 290 capable of directly coupling to an electrical processing unit 310 or to an extension cable which in turn couples to the electrically processing unit 310.

Preferably, the cable 120 is routed through the machine case 288 by passing through a rubber grommet 294 internal to an adaptor 292 operatively coupled to the machine case 288. The adaptor 292 includes a first end 296 having external and internal threads. The external threads of the adaptor are coupled with a threaded bore 300 in the machine case 288 for firmly connecting the adaptor 292 thereto. In some instances, the internal threads of the first end 296 of the adaptor 292 allow the mounting of the encapsulated transducer 10 via the threaded metal case 284. A second end 298 of the adaptor 292 having external threads may be coupled to a threaded aperture 304 in a junction box 302 such that the junction box 302 is mounted to the machine case 288. The junction box 302 allows any electrical connections operatively coupling the cable 120 to the electrical processing unit 310 to be enclosed in a weather-proof or explosion-proof environment.

In addition to use as a proximity transducer, the present invention may be employed very broadly in the monitoring and diagnostic field. One example is as a temperature transducer which would use a coil formed from a single wire thermocouple of the RTD type. The coil would be molded within the encapsulation 20 and the only change in the above delineated process may be in the use of perhaps a thinner overall encapsulation. This would provide for a suitable heat transfer to the RTD temperature sensing coil.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An information transmitting sensor and housing comprising:

a sensing element having a front face, a rear face, an air core and a body extending from said front face to said rear face;

a cable operatively coupled to said sensing element;

an electrical insulating component alignment preform operatively coupled to said sensing element and said cable;

a protective sleeve transfer molded flush with said front face of said sensing element and over an exterior surface of said body of said sensing element and overlying and extending between a portion of said cable and said front face of said sensing element;

a first interlocking means for interlocking said protective sleeve into said component alignment preform, said interlocking means integrally formed with said protective sleeve and extending away from an interior surface of said sleeve and into at least one passage disposed within said preform for mechanically interlocking said sleeve into said preform;

means, integrally formed with said sleeve at a predetermined length from said front face of said sensing element, for receiving at least one slideable support pin for spacing said front face of said sensing element a precise length from an injection mold cavity;

a cured injection molded monolith of material ensconcing said sensing element and a portion of said cable defining a seamless mass including an uninterrupted substantially uniform thick front wall substantially parallel with and directly abutting and uniformly extending away from said front face of said sensing element and seamlessly transitioning into an uninterrupted side wall circumscribing said sensing element and a portion of said cable, said side wall including at least one integrally formed extension extending into and positively engaging with said receiving means of said sleeve.

2. The sensor of claim 1 wherein said component alignment preform is disposed within both said monolith of cured moldable material and said sleeve means, said preform including a front end having an annular recess and a center post, a back end having an opening and a medial portion interposed between said front end and said rear end of said preform, said medial portion having a chamber in open communication with the opening in said back end.

3. The sensor of claim 2 wherein said component alignment preform includes a front ferrule and a rear ferrule bonded thereto and linearly spaced apart by said chamber along a long axis of said sensor and in open communication with said chamber.

4. The sensor of claim 3 wherein said component alignment preform includes a front passage and a rear passage disposed within said component alignment preform said front and rear passages are in open communication with said front and rear ferrules respectively.

5. The sensor of claim 4 wherein said sensing element is a coil having a first lead and a second lead extending away from said rear face of said coil.

6. The sensor of claim 5 wherein said coil is disposed within said annular recess of said preform and receives said center post within the center void of said coil thereby axially aligning said coil with said front and rear ferrules along the long axis of said sensor and defining an axial locator receiving means for receiving a locator pin to center said coil in the injection mold cavity.

7. The sensor of claim 6 wherein said first lead extends into the front passage of said preform and is electrically connected to said front ferrule.

8. The sensor of claim 7 wherein said second lead extends into the rear passage of said preform and is electrically connected to said rear ferrule.

9. The sensor of claim 8 wherein said cable includes at least a center conductor and a coaxial conductor separated from one another by at least one dielectric.

10. The sensor of claim 9 wherein at least one end of said cable is stripped in a step-like fashion to expose a length of at least said center conductor, dielectric and coaxial conductor.

11. The sensor of claim 10 wherein said stripped end of said cable passes through the opening in said back end of said perform and said center conductor is electrically and mechanically connected within a bore of said front ferrule and said coaxial conductor is electrically and mechanically connected within a bore of said rear ferrule.

12. The sensor of claim 11 including a seal circumscribing said dielectric at the stripped end of said cable and wedged between said dielectric and said chamber of said preform thereby providing a barrier therebetween.

13. The sensor of claim 12 wherein said body of said protective sleeve contours to said preform and the outer surface of said body of said coil and uniformly extends therefrom to a substantially smooth outer surface thereby eliminating any gaps between the protective sleeve and both the preform and said body of said coil.

14. The sensor of claim 13 wherein said transfer molded protective sleeve fills in the passages of said preform thereby forming said first and a second interlocking means interlocking with said preform and ensconcing said leads of said coil.

15. The sensor of claim 14 wherein said component alignment preform is formed from the same material as said cured injection molded monolith.

16. The sensor of claim 15 wherein said monolith of cured moldable material bonds with said preform and said sleeve.

17. The sensor of claim 16 wherein said monolith of cured moldable material ensconces a length of said cable proximate the back end of said preform where the cable emanates therefrom.

18. An encapsulated transducer for use in monitoring the status of rotating equipment in a harsh environment with a component alignment preform having a leading end with an active element and a trailing end with an information transmitting medium emanating therefrom, formed by:

transfer molding a full length protective sleeve flush with a front face of said active element, over an outer periphery of said active element and over a portion of said component alignment preform;

integrally forming with said full length sleeve at least one interlocking means extending into an interior passage of said component alignment preform;

integrally forming a locating means proximate said front face of said active element, said locating means defined by a portion of an air core of said active element and a center post integrally formed with said preform and extending a distance within said air core;

centering said active element in a mold cavity with a slideable locating pin coupling to said locating means and assuring proper registry in said mold cavity;

integrally forming a support receiving means with said protective sleeve proximate said component alignment preform;

further supporting and locating said active element and said component alignment preform in said mold cavity with a support means being received in said support receiving means and removing said locator;

molding a uniform uninterrupted front wall over a front face of said active element and a seamless body over said protective sleeve, said preform and a portion of said information transmitting medium with a moldable material except for an area of support;

removing said support means;

injecting moldable material adjacent the support means for filling in the areas heretofore occupied by said support means;

wherein said active element is ensconced in a seamless mass of said moldable material having a uniform uninterrupted front wall abutting said front face of said active element and seamlessly transitioning into said body whereby said active element is precisely located in said moldable material to accurately address the rotating equipment.

19. The encapsulated transducer as formed in claim 18 wherein integrally forming a support receiving means includes providing grooves in said protective sleeve at a precise length from said front face of said active element.

20. The encapsulated transducer as formed in claim 19 wherein the forming steps further include supporting said active element and said component alignment preform and said protective sleeve with a plurality of said support means received within said grooves and spacing said front face of said active element a precise distance from a front wall of said mold cavity.

21. The encapsulated transducer as formed in claim 20 wherein the forming steps further include providing a drive means to said slideable locator means and to said plurality of slideable support means for sliding said locator and each said support means into or out of the mold cavity.

22. The encapsulated transducer as formed in claim 21 wherein the forming steps further include providing a control means for signaling the drive means for independently sliding said locator pin and each said support means into or out of the mold cavity.

23. The encapsulated transducer as formed in claim 22 wherein the forming steps further include providing an alterable timing sequence for orchestrating the control means signaling of the drive means.

24. A transducer for monitoring the status of rotating equipment wherein a shaft of the rotating equipment is exposed to said transducer, comprising, in combination:

means for mounting said transducer a distance from the shaft such that a tangent of the shaft is perpendicular to a long axis of said transducer, said transducer including an air core coil located proximate the shaft, a front portion of said transducer including an uninterrupted protective wall having uniform thickness along a forwardmost portion of said air core coil, a component alignment preform;

said coil symmetrically disposed about the long axis and operatively coupled to said component alignment preform, and a full length sleeve molded flush with said forwardmost portion of said air core coil and molded over an outer periphery of said coil and a portion of said preform;

means for interlocking said full length sleeve into said component alignment preform said interlocking means integrally formed with said full length sleeve and extending away from an interior surface of said sleeve and into at least one passage disposed within said preform for mechanically locking said sleeve into said preform;

a protective seamless encapsulation seamlessly and integrally formed with said protective front wall and ensconcing said coil and a leading portion of a cable operatively coupled to said coil, said cable extending away from said transducer to an electrical processing unit.

25. An encapsulated transducer, comprising in combination:

a sensing element having a center void, a front face, a back face, a body and a first lead and a second lead extending away from said sensing element and spaced apart from each other;

an elongated component alignment preform including a front ferrule and a rear ferrule molded and interlocked within said preform and linearly spaced apart along a long axis of said transducer;

said preform including a center post integrally formed therewith and axially aligned with said front and rear ferrules and axially extending away from a front end of said preform;

said preform including a back end having an opening and a medial portion interposed between said front end and said back end of said preform, said medial portion having a chamber in open communication with the opening in said back end of said preform, said rear ferrule and said front ferrule;

said preform having a first passage in open communication with said front ferrule and a second passage in open communication with said rear ferrule;

said center post and said front end of said preform defining a sensing element receiving area wherein said center post extends a distance within said center void of said sensing element and defines an axial locating receiving means for receiving a locator pin to center said sensing element in a mold cavity;

said first lead of said sensing element extending along the long axis of said transducer and into said first passage of said preform and operatively coupled to said front ferrule;

said second lead of said sensing element longitudinally extending along said long axis of said transducer and extending into said rear passage of said preform and operatively coupled to said rear ferrule;

the cable having a first conductor and a second conductor received within said chamber of said preform wherein said first conductor is operatively coupled to said front ferrule and said second conductor is operatively coupled to said rear ferrule;

a transfer molded protective sleeve having a first end molded flush with said front face of said sensing element, a second end terminating proximate said back end of said preform and a body longitudinally extending along a long axis of said transducer from said first end to said second end of said transfer molded sleeve;

said transfer molded sleeve including a preform interlocking means defined by an integrally formed extension of said transfer molded sleeve extending into at least one of said first and second passages formed in said preform and mechanically locking into said preform thereby becoming an integral part thereof;

said transfer molded sleeve including at least one radial receiving means disposed substantially perpendicular to said long axis of said transducer and precisely spaced a length from said front face of said sensing element, said radial receiving means defining a groove to receive at least one radially slideable support for supporting and spacing said front face of said sensing element said precise length from a front wall of the mold cavity;

an injection molded monolith of cured moldable material ensconcing said sensing element and a portion of said cable defining a seamless mass of material circumscribing said sensing element and a portion of said cable;

said seamless mass including a uniform and an uninterrupted front wall extending away from said front face of said sensing element and integrally formed with a seamless side wall circumscribing and ensconcing said sensing element and said portion of said cable;

said transfer molded sleeve including at least one radial receiving means for receiving a radial support for supporting and precisely locating said front face of said sensing element said precise length from the front wall of the mold cavity to accurately control thickness of the uninterrupted uniform front wall wherein said thickness is accurately reproducible from one transducer to the next as a result of the preform being accurately spaced in the mold cavity with said radial receiving means.

26. A transducer, comprising in combination:

a coil having an air core;

a cable operatively coupled to said air core coil;

a component alignment preform operatively coupled to said air core coil and said cable, said preform including a front end having a coil receiving area and a center post longitudinally extending away from said receiving area and into said air core of said coil;

a first receiving means for receiving a retractable locator pin for centering said coil in an injection mold cavity, said first receiving means defined by an area of the air core extending from a front face of said air core coil to a front end of said center post;

a transfer molded protective sleeve having a first end molded flush with said front face of said coil, a body extending from said first end of said sleeve over said coil and terminating proximate a back end of said preform;

a second receiving means for receiving at least one support pin for spacing said front face of said coil a precise predetermined length from a front wall of the injection mold cavity, said second receiving means defined by at least one groove integrally formed with said protective sleeve at a predetermined length from said front face of said coil;

an uninterrupted and substantially uniform thick injection molded front wall filling in said first receiving means and directly abutting and uniformly extending away from said front face of said coil;

an uninterrupted injection molded side wall integrally formed with and seamlessly transitioning from said injection molded front wall, said front and side walls forming a seamless monolith of cured moldable material ensconcing said coil, said sleeve and a portion of said cable whereby the thickness of said uniform and uninterrupted injection molded front wall is accurately reproducible from one transducer to the next as a result of said second receiving means being integrally formed with said sleeve at the predetermined length from said front face of said coil and receiving at least one support pin for precisely spacing said front face of said coil the precise length from the front wall of the mold cavity.

27. A transducer, comprising in combination:

a coil having a front face, a rear face, an air core and a body extending from said front face to said rear face of said coil;

a cable operatively coupled to said coil;

an electrical insulating component alignment preform operatively coupled to said coil and said cable;

a protective sleeve transfer molded over an exterior of said body of said coil and overlying and extending between a portion of said preform and said front face of said coil;

means for interlocking said protective sleeve into said component alignment preform, said interlocking means integrally formed with said protective sleeve and extending away from an interior surface of said sleeve and into at least one passage disposed within said preform for mechanically locking said sleeve into said preform;

means integrally formed with said protective sleeve for receiving at least one retractable support means for spacing said front face of said coil a precise predetermined length from a front wall of an injection mold cavity and supporting said coil, said protective sleeve and said preform in the injection mold cavity;

a cured injection molded monolith of material ensconcing and conforming to said sensing element and a portion of said cable defining a seamless mass circumscribing and conforming to said sensing element, said protective sleeve, said preform and a portion of said cable;

said seamless mass including an uninterrupted uniform front wall directly abutting and uniformly extending from said front face of said sensing element and seamlessly transitioning into an uninterrupted side wall, said side wall extending into and interlocking with said receiving means.

* * * * *